(No Model.) 2 Sheets—Sheet 1.
G. W. CILLEY.
LEVER ACTION FOR BREAKDOWN GUNS.
No. 514,414. Patented Feb. 6, 1894.
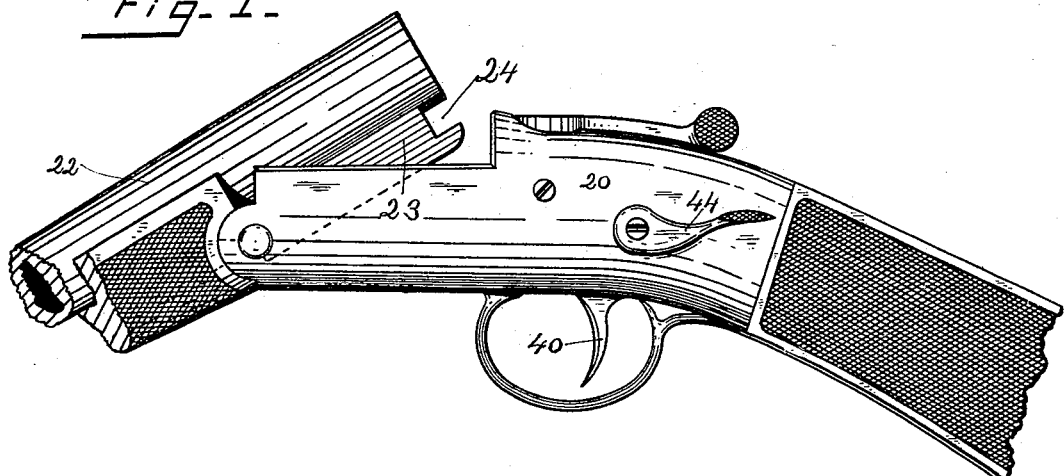
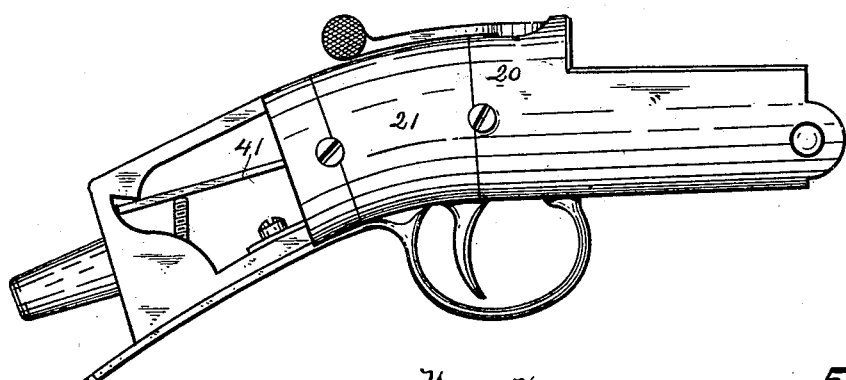
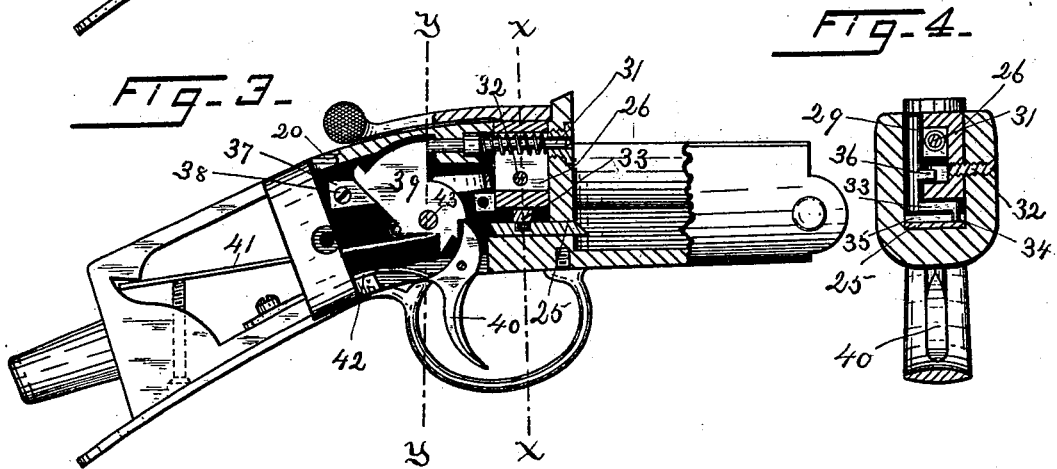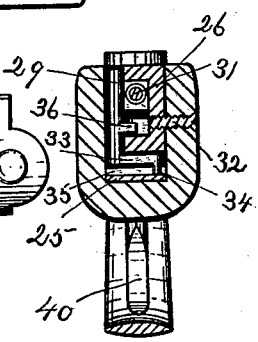
Witnesses
Inventor
George W. Cilley
By Attorney
Frank H. Allen (No Model.) 2 Sheets—Sheet 2.
G. W. CILLEY.
LEVER ACTION FOR BREAKDOWN GUNS.
No. 514,414. Patented Feb. 6, 1894.
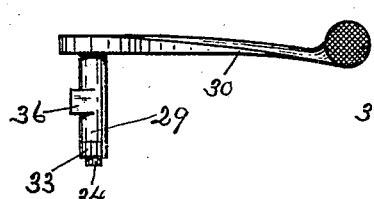
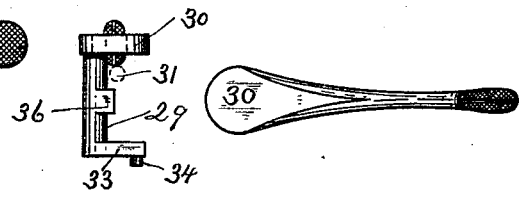
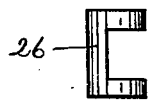
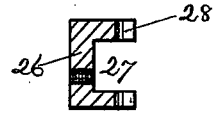
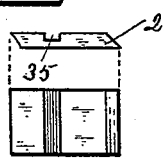
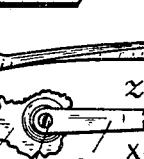
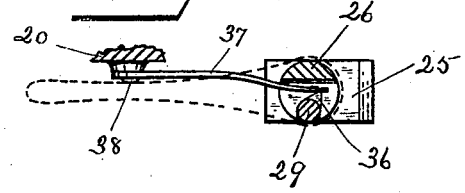
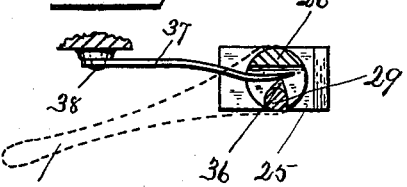
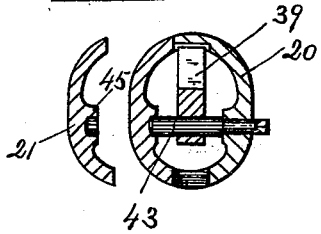
Witnesses
Inventor
George W. Cilley,
By Attorney
Frank H. Allen

UNITED STATES PATENT OFFICE.

GEORGE W. CILLEY, OF NORWICH, CONNECTICUT, ASSIGNOR TO THE CRESCENT FIRE ARMS COMPANY, OF SAME PLACE.

LEVER-ACTION FOR BREAKDOWN GUNS.

SPECIFICATION forming part of Letters Patent No. 514,414, dated February 6, 1894.

Application filed April 10, 1893. Serial No. 469,717. (No model.)

*To all whom it may concern:*

Be it known that I, GEORGE W. CILLEY, a citizen of the United States, residing at Norwich, in the county of New London and State of Connecticut, have invented certain new and useful Improvements in Fire-Arms, which improvements are fully set forth and described in the following specification, reference being had to the accompanying two sheets of drawings.

My invention relates chiefly to single-barrel, break-down guns, in which the hinged barrel is locked in firing position by a so called "top snap bolt," and the object of said invention is to improve materially the said bolt, and its supports, with a view to insuring greater strength of parts than has heretofore been possible. In arms of this class the firing-pin (which co-acts with the hammer to explode the primer of the cartridge) is of necessity located in the center of the gun frame and the top-snap bolt, if also centrally located, has heretofore been cut away in part, in some instances, to permit the free working of the firing pin and to allow the swinging of said bolt to unlock the barrel. When the bolt is thus cut away it becomes more or less weakened and my present purpose is to provide a form of bolt, and supports for the same, which will in no degree lessen the strength, convenience and utility of the parts.

To more clearly explain my invention I have provided the annexed drawings, in which—

Figure 1 is a front side elevation of the frame of a gun embodying my improvements, having also connected therewith portions of the fore-wood and barrel of the arm. Fig. 2 is a rear side view of the same with the barrel removed. Fig. 3 is a rear side view with the side-plate removed and with the breech-frame partly broken away to expose the interior parts. Figs. 4 and 5 are cross sections on lines x—x and y—y of Fig. 3. Figs. 6, 7 and 8 are, respectively, side, front-end, and plan views of the "top-snap" and its operating lever. Figs. 9 and 10 are side and plan views of a certain bushing which supports, in part, the pintle of said top-snap and Fig. 11 is a central, vertical, sectional view of said bushing on line x—x of Fig. 10. In Fig. 12 I have shown edge and plan views of the bolt by means of which the barrel is locked in its closed position. Fig. 13 illustrates the top-snap, its supporting bushing and the barrel locking bolt, and also shows a spring whose free end bears against a cam projection formed on the pintle of the top-snap. This spring serves to hold the top-snap bolt in its normal (closed) position. Fig. 14 is a cross-sectional view on line x—x of Fig. 13. Figs. 15 and 16 are sectional plan views on line z—z of Fig. 13, illustrating clearly the action of said spring upon the top-snap pintle.

In the drawings 20 denotes the breech-frame of the arm, cored to receive the lock-work, and provided with a removable side-plate 21 for convenience in assembling and adjusting the operative parts of the arm. The barrel 22 is hinged to a forward extension of the breech-frame and is adapted to be tilted upon its hinge, as in Fig. 1, to expose the rear end of said barrel. Secured to the under side of the barrel, at the rear end, is a rib or lug 23 that is notched as at 24 to co-act with a bolt 25 located in the breech-frame and adapted to move longitudinally in its seat. When slid forward its end projects through the lower portion of the recoil shield a distance sufficient to interlock with the barrel lug 23.

The frame 20 is bored from the top downward, (immediately over this barrel bolt) to receive a bushing 26 whose central portion is cut away transversely to the axial center of the bushing, as at 27. The top and bottom ends are then slotted in a direction parallel with said axial center, as at 28, thus cutting into the periphery of said ends but leaving them substantially circular so that when the bushing is entered in the frame-opening it may fit as snugly therein as if its circular ends were in no degree mutilated. These vertical slots, or notches, 28 are provided to form supports for the pintle 29 of my top-snap, which pintle, it will be noticed, is offset from the center of the arm. The integral operating lever 30, of the top-snap is offset in the opposite direction so that, when the several parts are assembled the lever 30 lies along the top, central, portion of the arm and its outward appearance is precisely the same as if the pintle were also centrally located. By thus offsetting the top-snap pintle, and cutting away, transversely, the bushing, as at 27, I provide clear space between said pintle and bushing sufficient for a firing-pin 31 of good size and thereby locate said firing-pin in the center of the recoil shield, where it may register with the primer of a cartridge in the barrel. The firing-pin is indicated by a circle of dotted lines in Fig. 7 and is also shown in Figs. 3 and 4. Bushing 26 may be held rigidly in place, in the breech frame, by a screw 32 passing through the frame and into said bushing.

The lower end of pintle 29 is formed with a radial arm 33 whose free end has a downwardly projecting stud 34 which, when the parts are assembled, enters a transverse groove 35 in the barrel bolt 25, in such manner that the rocking of pintle 29 in its supports will operate to slide the said bolt lengthwise. The pintle is formed with a cam projection 36 which is engaged by the free end of a flat spring 37 whose opposite end is secured, by a screw 38, to the breech-frame, as seen in Fig. 3.

Spring 37 bears with sufficient force upon the cam projection to swing the operating lever 30 into longitudinal alignment with the breech-frame and to force the barrel-bolt 25 forward into locking engagement with the barrel lug 23.

By forming, and supporting, my top-snap, and its connected parts, in the manner described I am able to give all necessary strength to these parts and also to leave the central portion of the frame to the unobstructed use of the firing-pin.

The lock parts of my arm do not differ materially from those of ordinary hammerless, or semi-hammerless, guns.

39 denotes the hammer and 40 the trigger, the former being controlled by a main spring 41 and the latter by a spring 42. The hammer is fixed upon a stud 43 which extends through the breech frame, as seen in Fig. 5, and has fastened upon its projecting end a lever-arm 44, as in Fig. 1, by means of which the concealed hammer 39 may be cocked. In assembling the lock-work, the hammer is entered through the open, rear, side of the breech-frame and stud 43 is passed through the front wall of the breech-frame as in Fig. 5.

The side-plate 21 has a boss 45, on its inner face, which is bored to fit over the end of the hammer stud, when the side-plate is screwed home, thus providing a substantial journal support for the otherwise free end of the hammer stud and concealing it from view upon the rear side of the frame. The described manner of supporting the hammer stud I conceive to be new.

My arm as a whole, is strong and durable, may be cheaply constructed and its elementary parts may be easily assembled.

Having described my invention, I claim—

1. In a fire-arm, in combination in and with a breech-frame, a top-snap lever having an offset pintle, and a bushing for supporting said pintle, substantially as and for the purpose specified.

2. In a fire-arm, in combination, a breech-frame, a bushing seated in said frame, said bushing being slotted transversely and grooved longitudinally as set forth, and a top-snap whose pintle is offset and journaled in the said longitudinal grooves of the bushing, substantially as and for the object specified.

3. In a fire-arm, in combination, a breech-frame, a bushing fixedly seated in said frame as set forth, (the middle portion of said bushing being cut transversely and having its ends grooved longitudinally), a top-snap operating lever having an offset pintle supported in said bushing grooves, a cam extension upon said pintle and a spring bearing upon said cams; all being substantially as described and for the purposes specified.

4. In a fire-arm, in combination, a breech-frame, a transversely slotted bushing seated in said frame in the rear of the recoil shield, a top-snap lever having an offset pintle supported in the grooved ends of said bushing, and a firing pin supported in the breech-frame and extending between the said pintle and the opposing wall of the bushing, substantially as and for the purposes specified.

5. In combination with the breech-frame of an arm, and a barrel hinged thereto having a projecting lug upon its under side, a transversely slotted bolt located in the breech-frame and adapted to interlock with said barrel-lug in manner as set forth, a bushing seated in said breech-frame immediately over said bolt, a top-snap with an offset pintle supported in longitudinal grooves in said bushing, said pintle being formed with a radial arm whose free end lies in the transverse slot of said bolt; all being substantially as and for the purposes specified.

GEORGE W. CILLEY.

Witnesses:
FRANK E. CILLEY,
FRANK A. FOSTER.